United States Patent [19]
Hughes

[11] 3,779,614
[45] Dec. 18, 1973

[54] VEHICLE BRAKING SYSTEMS
[75] Inventor: Michael James Hughes, Tyseley, England
[73] Assignee: Girling Limited, Birmingham, England
[22] Filed: Mar. 31, 1972
[21] Appl. No.: 240,117

[30] Foreign Application Priority Data
Apr. 2, 1971 Great Britain..................... 8,552/71

[52] U.S. Cl.................................. 303/89, 74/476
[51] Int. Cl............................................. B60t 7/08
[58] Field of Search ..................... 303/7, 9, 13, 52, 303/54, 89; 74/473, 475, 476, 471 XY; 188/265

[56] References Cited
UNITED STATES PATENTS
| | | | |
|---|---|---|---|
| 3,586,392 | 6/1971 | Ballard et al. | 303/89 |
| 2,273,068 | 2/1942 | Ross et al. | 74/473 |
| 902,559 | 11/1908 | Coldwell | 74/476 |
| 1,250,355 | 12/1917 | Robinson et al. | 74/476 |

Primary Examiner—Milton Buchler
Assistant Examiner—Charles E. Frankfort
Attorney—Samuel Scrivener, Jr. et al.

[57] ABSTRACT

A control valve arrangement particularly for use in a vehicle braking system having fluid pressure brake actuator means and fluid pressure controlled lock actuator means, comprises two separate control valves operated by a single control lever, and a gate which governs movement of the control lever has two parallel legs and two parallel cross-paths intersecting the legs. Mechanical one-way latching means co-ordinate control of the respective valve in such a manner that the lock actuator is rendered operative and inoperative only at predetermined pressure values of the brake actuator means.

3 Claims, 2 Drawing Figures

VEHICLE BRAKING SYSTEMS

This invention relates to control valve means particularly suitable for use in fluid pressure braking systems in which fluid pressures are supplied separately to a service brake actuator (such as a wheel cylinder) and to a lock unit for holding the brake applied mechanically and having a fluid pressure motor for releasing the lock. Such an arrangement is described, for example in the complete specification of our co-pending Patent application No. 54114/68. If the lock unit comprises resilient means for protecting the lock against mechanical overload in the "applied" condition, it is desirable to protect the resilient means themselves against excessive deflection and loading, and the present invention is concerned with a "gate" type of control valve arrangement for this purpose.

In accordance with the present invention, there is provided a fluid pressure control valve means comprising two separate control valves for regulating the pressure in separate pressure systems, a common operating lever for controlling the respective valves by movements in two mutually transverse directions and a gate constraining movements of the lever, wherein the gate has a first and second parallel legs, movement of the lever alone either of which varies the setting of one control valve, and first and second cross-paths transverse to and intersecting the two legs, movement of the lever along either of which cross-paths varies the setting of the other control valve, and one-way latching means positioned to prevent movement of the lever from one end of the second leg into the first leg except through the second cross-path which is positioned intermediate the ends of the legs.

Preferably, a second latching means prevents movement of the lever from the first leg into the second leg except through the first cross-path.

When incorporated in a vehicle braking system of the form first mentioned, the control means ensures that the lock unit is only applied at a predetermined high pressure, and only released at a predetermined lower pressure.

One form of control valve arrangement in accordance with the invention is described below, by way of example, with reference to the accompanying drawings, in which.

Figure 1:
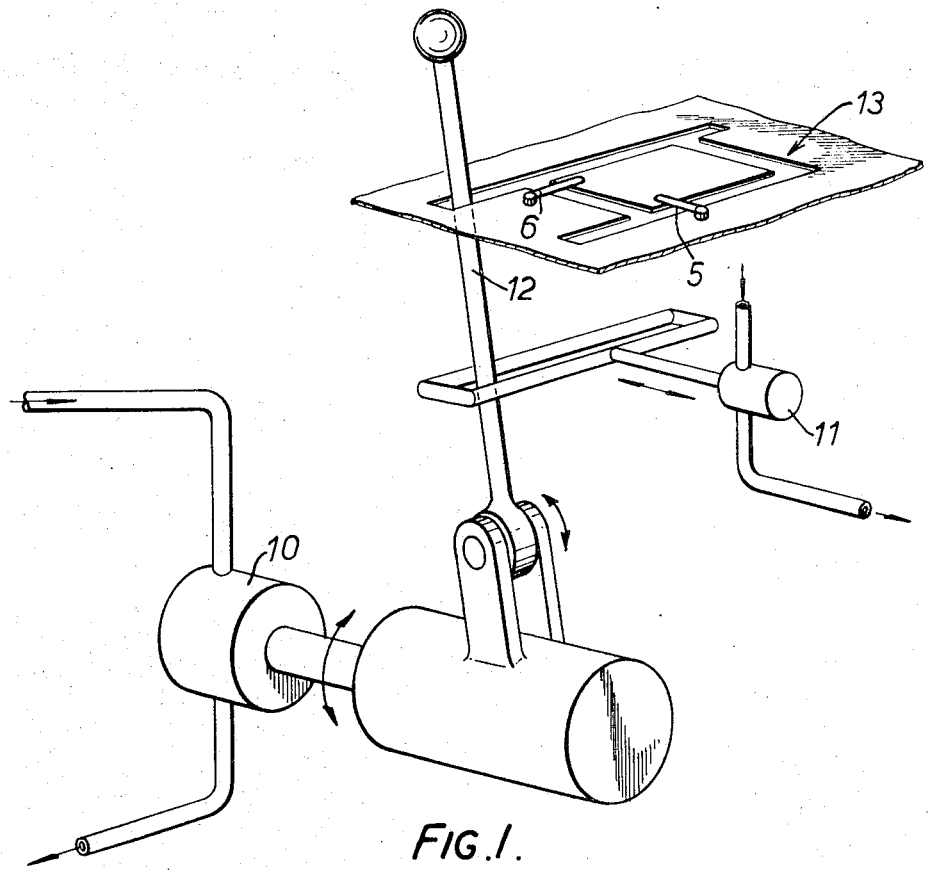
FIG. 1 is a perspective view of the control valve arrangement.

The control valve arrangement comprises two separate control valves 10 and 11 arranged to be operated by a common control lever 12, movement of which is constrained by a gate 13. The gate restricts movement of the lever to movements in two mutually transverse directions, movement in one direction varying the setting of valve 10 between zero pressure and a maximum pressure and movement in the other direction opening and closing the control valve 11. The valves are of any suitable type known per se, each being responsive to an angular or a rectilinear displacement of its actuating member.

In use, control valve 10 is connected in a pressure line between a pressure source and a brake actuator, such as a wheel brake cylinder, and valve 11 between a pressure source and a lock actuator unit.

Figure 2:
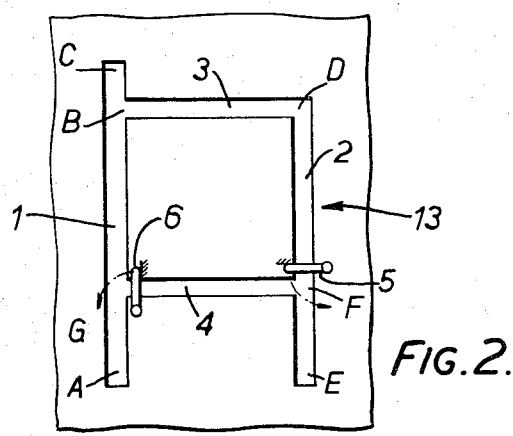
FIG. 2 is a diagrammatic view of the gate and latching means.

Referring now to FIG. 2, movement along a main leg 1 from A to C effects a progressive pressure rise through the actuator control valve 10 from zero to the maximum available pressure, say 2,000 p.s.i. A second parallel leg 2 controls a pressure range from zero at E to a pressure below the maximum, say 1,760 p.s.i. at D.

Pressure through the lock unit control valve 11 is varied by movement of the control lever along either of two parallel cross paths 3 and 4, from zero at D and F, to predetermined maximum pressure at B and G. Mechanical one-way latching devices 5 and 6 are included at F and G, so that the control lever can only be moved to relieve the lock motor pressure along the path B,D at an actuator pressure of 1,760 p.s.i. and lock motor pressure is restored by movement of the lever from F to E, at an actuator pressure of 1,300 p.s.i. Each latching means conveniently comprises a swinging arm lightly spring biased against a stop so as to extend across the respective leg or cross-path of the gate. The latch is readily swung away from the stop when engaged by the lever 12 from one side, but blocks the lever against movement in the opposite direction.

In use, the control lever is normally at point A, so that the lock motor is pressurised to prevent the lock from coming into operation. To park the vehicle, the lever is moved to point B, to apply 1,760 p.s.i. to the actuator, and then to D to exhaust the lock motor. The actuator pressure is then relieved by moving the lever from D to E. Due to relaxation in the lock mechanism, the effective load exerted by the lock unit is just less than that corresponding to an actuator pressure of 1,300 p.s.i. but in excess of the initial pre-load of the resilient means of the lock unit. To release the lock, the lever is moved from E to F, (where it is checked by the non-return gate), thus supplying pressure at 1,300 p.s.i. to the actuator to relieve the lock of load, and then from F to G to restore normal operating pressure to the lock motor, releasing the lock.

The non-return gate at G thus prevents a parking operation with insufficient parking brake effort.

I claim:

1. Fluid pressure control valve means comprising two separate control valves for regulating the pressure in separate pressure systems, a common operating lever operatively coupled to the said valves for controlling the same by movements in two mutually transverse directions, a gate constraining movements of said lever, said gate having first and second parallel legs, movement of said lever along either of which varies the operative setting of one said valve, and first and second crosspaths transverse to and intersecting said first and second legs, one of said crosspaths being intermediate the ends of said legs, movement of said lever along either of said crosspaths being operative to vary the operative setting of the other of said valves, and mechanical one-way latching means constructed and arranged that when said lever is at the end of a selected one of said legs which end is nearest the intermediate crosspath said lever is prevented from movement to the other leg except through said intermediate cross-path.

2. The control valve means of claim 1 including second mechanical one-way latching means constructed and arranged so that when said lever is in said other leg it is prevented from movement into said first leg except through the other of said cross-paths.

3. Control valve means as claimed in claim 2, in combination with a vehicle braking system comprising first and second pressure paths, a brake actuator in said first path and a lock actuator unit in said second path, said separator control valves being positioned in said first and second pressure path, respectively, whereby said gate and said first and second latching means permit said lock actuator to be applied only at a predetermined high pressure and to be released only at a predetermined lower pressure.

* * * * *